(12) United States Patent
Kim et al.

(10) Patent No.: US 12,428,062 B2
(45) Date of Patent: Sep. 30, 2025

(54) REAR STRUCTURE FOR A VEHICLE

(71) Applicants: HYUNDAI MOTOR COMPANY, Seoul (KR); KIA CORPORATION, Seoul (KR)

(72) Inventors: Sung Hun Kim, Bucheon-si (KR); Sung Woo Kim, Seongnam-si (KR); Ju Woong Park, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 400 days.

(21) Appl. No.: 18/071,754

(22) Filed: Nov. 30, 2022

(65) Prior Publication Data
US 2023/0088647 A1 Mar. 23, 2023

Related U.S. Application Data

(63) Continuation-in-part of application No. 17/407,794, filed on Aug. 20, 2021, now Pat. No. 11,648,988.

(30) Foreign Application Priority Data
Dec. 28, 2020 (KR) .................. 10-2020-0184790

(51) Int. Cl.
*B62D 21/15* (2006.01)
*B60K 15/063* (2006.01)
*B62D 25/20* (2006.01)

(52) U.S. Cl.
CPC ....... *B62D 21/152* (2013.01); *B62D 25/2027* (2013.01); *B60K 15/063* (2013.01)

(58) Field of Classification Search
CPC .. B60K 15/063; B62D 21/152; B62D 25/087; B62D 25/2027
See application file for complete search history.

(56) References Cited

U.S. PATENT DOCUMENTS 11,110,962 B2   9/2021   Choi et al.
2002/0043814 A1*  4/2002  Weiman ............... B62D 25/087
                                                      296/29

(Continued)

FOREIGN PATENT DOCUMENTS

EP        1415896 A2 *  5/2004  ........... B62D 25/087
JP        H10129533 A    5/1998

(Continued)

OTHER PUBLICATIONS

DE3905650C2 with English Translation (Year: 1995).*

(Continued)

*Primary Examiner* — Lori Lyjak
(74) *Attorney, Agent, or Firm* — Lempia Summerfield Katz LLC

(57) ABSTRACT

A rear structure of a vehicle includes: a rear floor, and a pair of diagonal members coupled to a bottom surface of the rear floor, extending obliquely from both sides of the rear floor to a rear side of the rear floor, and symmetrical with respect to a longitudinal centerline of the rear floor. The rear structure further includes a pair of side extensions coupled to the bottom surface of the rear floor at the both sides of the rear floor, respectively, and extending in a longitudinal direction of the rear floor. The rear structure includes a cross member disposed between the pair of side extensions at a rear bottom surface of the rear floor, and the cross member has both ends each spaced apart from a corresponding side extension.

9 Claims, 7 Drawing Sheets

(56) References Cited

U.S. PATENT DOCUMENTS

| | | | |
|---|---|---|---|
| 2016/0052556 A1 | 2/2016 | Kano et al. | |
| 2017/0197667 A1 | 7/2017 | Kabayama | |
| 2020/0180701 A1 | 6/2020 | Shin et al. | |
| 2020/0231216 A1 | 7/2020 | Choi et al. | |
| 2021/0214018 A1* | 7/2021 | Okamura | B62D 25/02 |
| 2021/0336306 A1* | 10/2021 | Matecki | H01M 50/224 |
| 2022/0204094 A1 | 6/2022 | Kim et al. | |

FOREIGN PATENT DOCUMENTS

| | | |
|---|---|---|
| JP | 2015081042 A | 4/2015 |
| JP | 2019137351 A | 8/2019 |
| KR | 20200091665 A | 7/2020 |
| KR | 20200094387 A | 8/2020 |
| KR | 20220093749 A | 7/2022 |

OTHER PUBLICATIONS

CN105383561A with English Translation (Year: 2016).*
CN105539590B with English translation (Year: 2017).*
DE102019126187A1 with English Translation (Year: 2020).*

* cited by examiner

FIG 1A "PRIOR ART"
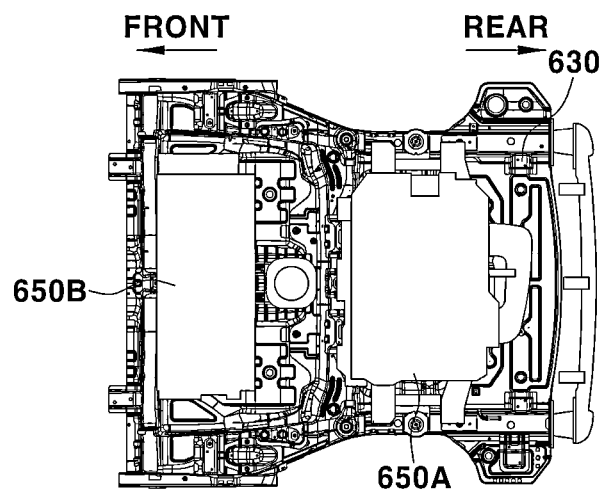
FIG 1B "PRIOR ART"
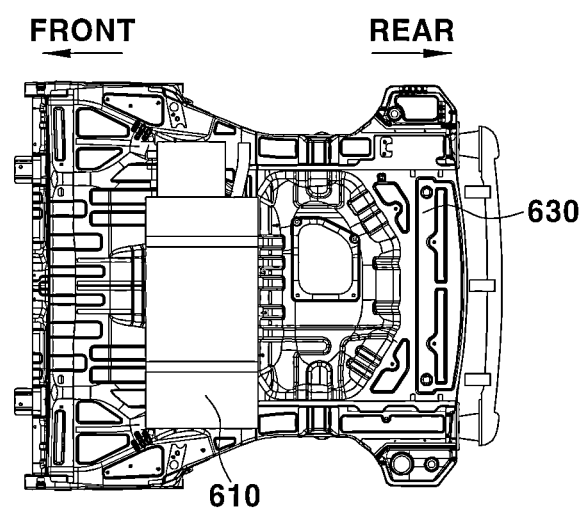

REAR STRUCTURE FOR A VEHICLE

CROSS-REFERENCE TO RELATED APPLICATION

This application is a continuation-in-part application of non-provisional U.S. patent application Ser. No. 17/407,794, filed on Aug. 20, 2021, which claims priority to and the benefit of Korean Patent Application No. 10-2020-0184790, filed on Dec. 28, 2020, the entire contents of each of which are incorporated herein by reference.

BACKGROUND

(a) Technical Field

The present disclosure relates to a rear structure of a vehicle, and more particularly, to a rear structure of a vehicle including a structure that effectively distributes a rear load path and enhances protection against a rear impact.

(b) Background Art

A hybrid electric vehicle (HEV) is driven using both an engine and a motor. The motor receives electric energy stored in a battery and generates power to drive the vehicle. When the electric energy in the battery falls below a predetermined level, the vehicle is driven by the engine. The hybrid electric vehicle is regarded as an eco-friendly vehicle because such a vehicle continuously charges the battery through self-generation and regenerative braking while traveling, thus consuming less fuel and emitting less pollutant.

A plug-in hybrid electric vehicle (PHEV), which is a type of hybrid electric vehicle, has a battery larger in capacity than that of a conventional hybrid electric vehicle. For this reason, in the plug-in hybrid electric vehicle, the battery is charged from an external electricity source and an electric motor is driven by the charged power. When all the charged electricity is consumed, then an engine is operated.

As such, a fuel tank and the battery must be installed in a limited space in the hybrid electric vehicle and must be protected from external impacts caused by collisions, etc., by an appropriate protective structure and layout design. Considering both aspects, the battery and fuel tank are mainly mounted on the rear floor of the vehicle body, along with a needed protective structure.

For example, as illustrated in FIGS. 1A and 1B, batteries 650A and 650B are mounted on the upper surface of a rear floor 630, and a fuel tank 610 is mounted on the bottom surface of the rear floor 630. In order to protect the fuel tank 610 in the event of vehicle collision, the fuel tank 610 is disposed a predetermined distance away from the rear of the vehicle, and the batteries 650A and 650B are disposed as two separate batteries to secure the capacity thereof.

To evaluate a rear impact performance of a vehicle, an offset impact test laterally offset with respect to the longitudinal centerline of the vehicle is used. In this example, when a rear impact occurs, a back beam is deformed and fractured. Although additional deformation is suppressed by a rear cross member, when, for example, an offset collision occurs at the left side with respect to the longitudinal centerline of the vehicle, the front end of a side member is bent and impact dispersion is insufficient due to the fractures of the back beam, so that a right member absorbs less impact force, while a left member rotates inwards.

The above information disclosed in this Background section is provided only to enhance understanding of the background of the present disclosure. Thus, it may contain information that does not form the prior art that is already known to a person of ordinary skill in the art.

SUMMARY OF THE DISCLOSURE

The present disclosure has been made in an effort to solve the above-described problems associated with the prior art, and it is an object of the present disclosure to provide a rear structure of a vehicle capable of effectively protecting a fuel tank and a battery against rear-end collisions.

The object of the present disclosure is not limited to the above-mentioned object, and other objects not mentioned will be clearly understood by those of having ordinary skill in the art to which the present disclosure pertains (hereinafter, "those skilled in the art") based on the description below.

The features of the present disclosure to achieve the object of the present disclosure as described above and perform the characteristic functions of the present disclosure are described below.

In one aspect of the present disclosure, a rear structure of a vehicle includes: a rear floor, and a pair of diagonal members which are coupled to a bottom surface of the rear floor, extend obliquely from both sides of the rear floor to a rear side of the rear floor, and are symmetrical with respect to a longitudinal centerline of the rear floor. The rear structure further includes: a pair of side extensions which are coupled to the bottom surface of the rear floor at the both sides of the rear floor, respectively, and extend in a longitudinal direction of the rear floor. The rear structure further includes a cross member disposed between the pair of side extensions at a rear bottom surface of the rear floor, and the cross member has both ends each spaced apart from a corresponding side extension.

Other aspects and embodiments of the present disclosure are discussed below.

It should be understood that the terms "vehicle" or "vehicular" or other similar terms as used herein include motor vehicles in general. Such motor vehicles may encompass passenger automobiles including sport utility vehicles (SUVs), buses, trucks, various commercial vehicles, watercraft including a variety of boats and ships, aircraft, and the like. Such passenger automobiles may include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed below.

BRIEF DESCRIPTION OF THE DRAWINGS

The above and other features of the present disclosure are now described in detail with reference to certain exemplary embodiments thereof illustrated in the accompanying drawings which are given hereinbelow by way of illustration only, and thus are not limitative of the present disclosure, and wherein:

FIG. 1A illustrates a top view of a rear floor of an exemplary hybrid vehicle;

FIG. 1B illustrates a bottom view of a rear floor of an exemplary hybrid vehicle;

Figure 2:
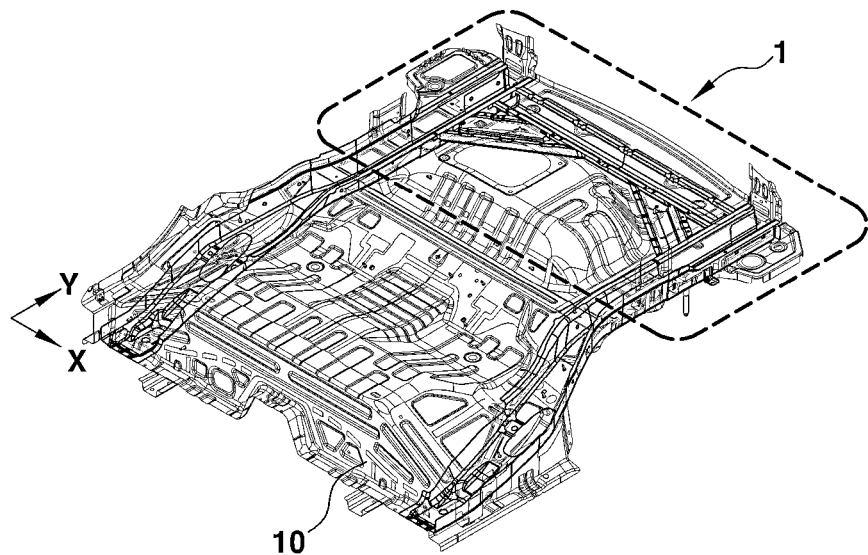
FIG. 2 illustrates a perspective view of a rear floor including a rear structure according to an embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, will be determined in part by the particular intended application and usage environment.

In the figures, the reference numbers refer to the same or equivalent parts of the present disclosure throughout the several figures of the drawing.

DETAILED DESCRIPTION

Descriptions of specific structures or functions presented in the embodiments of the present disclosure are merely exemplary for the purpose of explaining the embodiments according to the concept of the present disclosure. The embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

Meanwhile, in the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of exemplary embodiments of the present disclosure.

It will be understood that when an element is referred to as being "connected to" another element, the element can be directly connected to another element, or intervening elements may also be present. In contrast, when a component is referred to as being "directly connected to" another component, there are no intervening components present. Other terms used to describe relationships between components should be interpreted in a like fashion (e.g., "between" versus "directly between", "adjacent" versus "directly adjacent", etc.).

When a component, device, element, or the like of the present disclosure is described as having a purpose or performing an operation, function, or the like, the component, device, or element should be considered herein as being "configured to" meet that purpose or to perform that operation or function.

Throughout the specification, like reference numerals indicate like components. The terminology used herein is for the purpose of illustrating embodiments and is not intended to limit the present disclosure. In this specification, the singular form includes the plural sense, unless specified otherwise. The terms "comprises" and/or "comprising" used in this specification mean that the cited component, step, operation, and/or element does not exclude the presence or addition of one or more of other components, steps, operations, and/or elements.

The present disclosure provides a rear structure of a vehicle having excellent vehicle body performance against a rear collision in a hybrid electric vehicle, in particular, a plug-in hybrid electric vehicle (PHEV).

In one embodiment of the present disclosure, the rear structure of a vehicle includes one single high-voltage battery. The single high-voltage battery is increased in capacity and thus increased in size. According to the present disclosure, a fuel tank may be disposed behind the battery on the rear floor of the vehicle due to the rear structure having excellent performance against collision, and thus the battery increased in size may be efficiently disposed.

The strain of a fuel tank in a general internal combustion-engine vehicle is allowed up to about 40%, whereas in the case of a PHEV, the condition is strict and the strain of the fuel tank thereof is allowed only about 15%. For this reason, in the vehicle illustrated in FIGS. 1A to 1B, the fuel tank 610 is disposed on the relatively front side with respect to the rear of the vehicle so as to mount two batteries 650A and 650B separately. Due to the nature of a separated battery, the battery is cooled by air cooling, and in the case of an air-cooled battery, the performance thereof is deteriorated compared to a water-cooled battery.

The present disclosure adopts a structure capable of efficiently dispersing collision energy applied to the rear floor so as to dispose the fuel tank close to the rear of the vehicle. In addition, the present disclosure employs a single high-voltage battery to cool the battery by water cooling, thereby improving the performance of the battery.

Hereinafter, the present disclosure is described in detail with reference to the accompanying drawings.

Figure 3A:
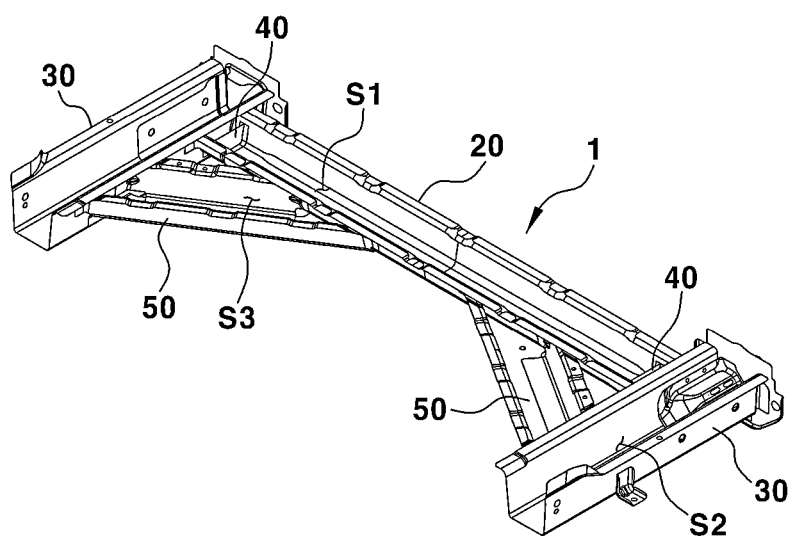
FIG. 3A is a view illustrating a portion indicated by the dotted line in FIG. 2 from which the rear floor is removed.
Figure 3B:
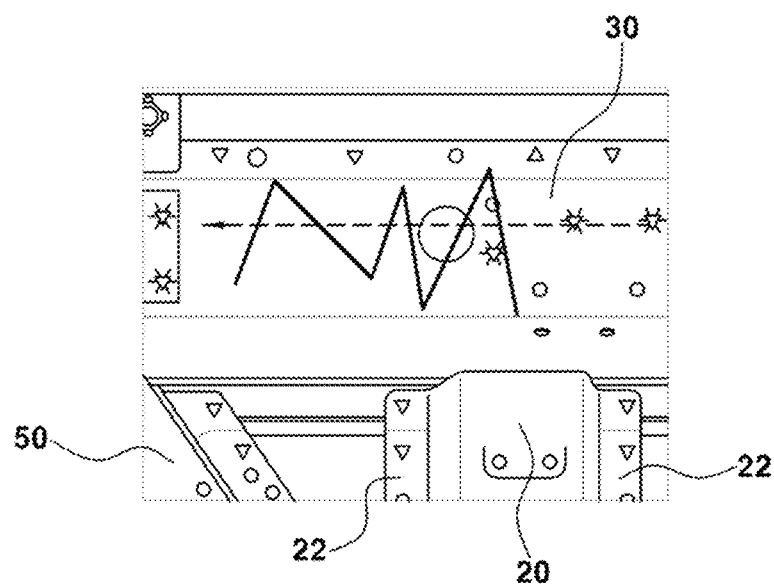
FIG. 3B illustrates the rear structure which is viewed from the rear side of FIG. 3A.
Figure 4:
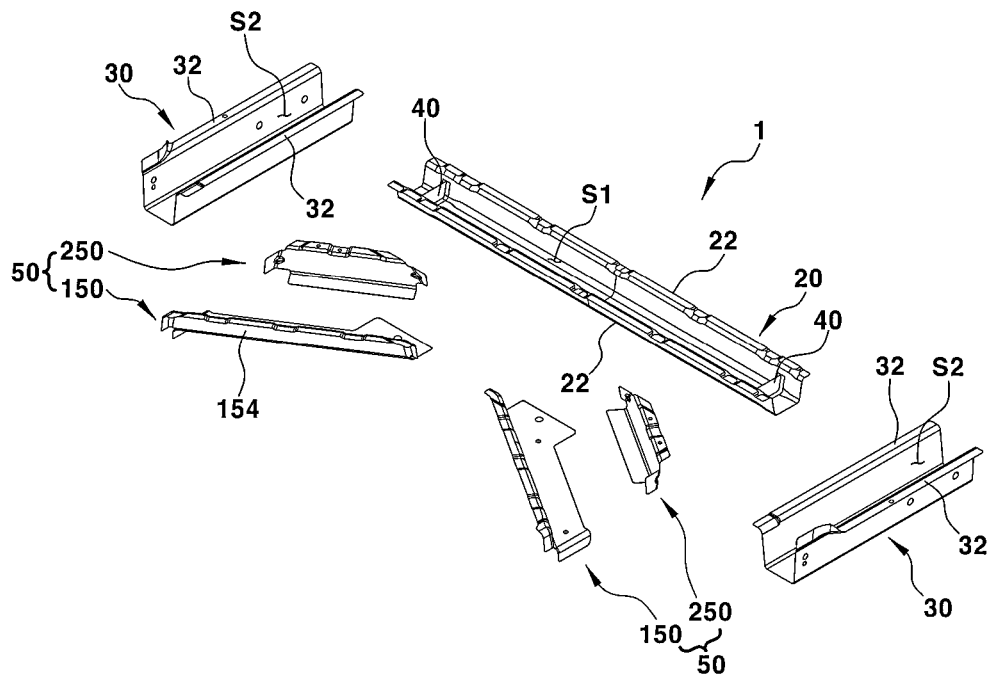
FIG. 4 illustrates an exploded perspective view of FIG. 3A.

FIG. 2 illustrates a perspective view of a rear floor including a rear structure according to an embodiment of the present disclosure, and FIG. 3A is a view illustrating a portion indicated by the dotted line in FIG. 2 from which the rear floor is removed to further illustrate the rear structure of a vehicle according to the present disclosure. FIG. 3B illustrates the rear structure of a vehicle according to the present disclosure which is viewed from the rear side of FIG. 3A, and FIG. 4 illustrates an exploded perspective view of FIG. 3A. Here, "X" denotes the lateral direction of the vehicle, and "Y" denotes the longitudinal direction of the vehicle.

As illustrated in FIGS. 2 to 4, a rear structure 1 of a vehicle according to an embodiment of the present disclosure may be provided on a rear floor 10. The rear structure 1 may include a cross member 20, a side extension 30, a coupling element 40, and a diagonal member 50. Particularly, the cross member 20, the side extension 30, the coupling element 40, and the diagonal member 50 are coupled to the bottom surface of the rear floor 10.

The cross member 20 is coupled to the bottom surface of the rear floor 10 and extends in the lateral direction X of the vehicle. The cross member 20 may have both ends each being spaced apart from a corresponding side extension 30.

The cross member 20 is coupled to the bottom surface of the rear floor 10 so as to define a first space S1 which is an empty space between the cross member 20 and the rear floor 10. As a non-limiting example, the cross section of the first space S1 is substantially rectangular.

According to an embodiment of the present disclosure, the cross member 20 includes end flange portions 22 bent from both sides of the cross member 20, respectively. The end flange portions 22 are bent from the longitudinal both sides of the cross member 20, and each of the end flange portions 22 has a profile corresponding to the rear floor 10 so as to be attached to the bottom surface of the rear floor 10.

As illustrated in FIG. 3A, the side extensions 30 are coupled to the both ends of the cross member 20, respectively, and also coupled to the bottom surfaces of the both sides of the rear floor 10. The side extensions 30 extend along the both sides of the rear floor 10, respectively, by a predetermined distance in the longitudinal direction Y of the vehicle.

The side extension 30 is coupled to the bottom surface of the rear floor 10 so as to define a second space S2 which is an empty space between the side extension 30 and the rear floor 10.

Meanwhile, according to an embodiment of the present disclosure, the side extension 30 includes side flange portions 32. The side flange portions 32 are bent from both sides of the side extension 30, respectively, and are attached to the bottom surface of the rear floor 10.

According to one embodiment of the present disclosure, as illustrated in FIG. 3B, the cross member 20 may have both ends each being spaced apart from a corresponding side extension 30. The end flange portion 22 may have both ends coupled to the side flange portions 32, respectively. The first space S1 may have both ends spaced apart from the second spaces S2, respectively. This configuration induces stable buckling of the side extensions 30 in the case of collision, thereby increasing the rate of absorbing impact energy.

According to an embodiment of the present disclosure, the rear structure may further include coupling elements 40 provided at both sides of the first space S1, respectively. The coupling element 40 may define a closed cross-section inside the first space S1. The coupling elements 40 may be provided at the both sides of the first space S1, respectively. The cross-sectional shape of the coupling element 40 may be substantially the same as that of the cross member 20. The coupling element 40 may have a closed cross-section inside the first space S1 so as to prevent inflow of foreign substances.

A pair of diagonal members 50 are respectively formed on both sides of the rear floor 10. The diagonal member 50 extends between the cross member 20 and a corresponding side extension 30. The diagonal member 50 is coupled to the bottom surface of the rear floor 10, and is disposed obliquely and substantially obliquely with respect to the longitudinal direction Y or the lateral direction X of the vehicle at the bottom surface of the rear floor 10. The pair of diagonal members 50 is arranged to be symmetrical to each other with respect to the longitudinal direction Y of the vehicle. Each of the diagonal members 50 has a first end coupled to the cross member 20 and a second end extending to a side surface of the rear floor 10, more specifically, the second end coupled to a corresponding side extension 30.

Figure 5:
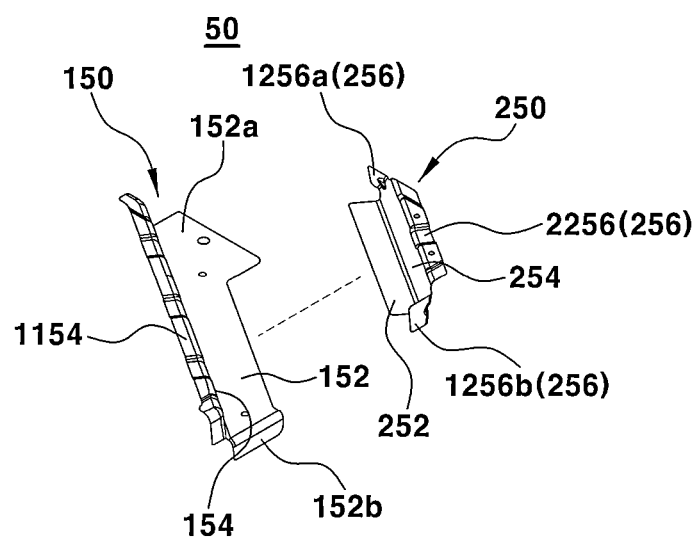
FIG. 5 illustrates a diagonal member according to an embodiment of the present disclosure.

Referring to FIG. 5, according to an embodiment of the present disclosure, the diagonal member 50 includes a first member 150 and a second member 250. The first member 150 is coupled to the second member 250 so as to define a third space S3 therebetween, the third space S3 having one side open. The open third space S3 is coupled to the bottom surface of the rear floor 10 so as to define a closed space.

The first member 150 has a cross-section of an "L" shape as a whole. The first member 150 includes a first portion 152 and a second portion 154. The first portion 152 is substantially parallel to or horizontal with the rear floor 10, and the second portion 154 is bent substantially perpendicularly from the first portion 152.

The first portion 152 has a proximal end 152a that is coupled to the lower surface of the cross member 20. The proximal end 152a of the first portion 152 changes the direction thereof from the oblique direction and extends parallel with respect to the longitudinal direction Y of the vehicle so as to facilitate coupling to the cross member 20. The proximal end 152a of the first portion 152 has a larger area than the remaining portions of the first portion 152 to increase the bonding force with the cross member 20. Here, the term "proximal" denotes a side closer to the cross member 20, and the term "distal" denotes a side farther from the cross member 20.

The first portion 152 has a distal end 152b that is bent downwards from the first portion 152 or bent towards the ground. The distal end 152b includes a profile substantially the same as the outer side surface of the side extension 30 so as to facilitate coupling to the side extension 30.

The second portion 154 extends substantially vertically from the first portion 152 and includes a coupling flange 1154 coupled to the rear floor 10. The coupling flange 1154 is bent from the second portion 154 and is attached to the bottom surface of the rear floor 10.

The second member 250 is coupled to the first member 150. According to an embodiment of the present disclosure, the second member 250 includes a bonding portion 252, a vertical portion 254, and a connecting flange 256.

The bonding portion 252 is directly bonded to the first portion 152 of the first member 150. According to an embodiment of the present disclosure, the bonding portion 252 may have a bottom surface bonded to the upper surface of the first portion 152. According to another embodiment of the present disclosure, the bonding portion 252 may have an upper surface bonded to the bottom surface of the first portion 152.

The vertical portion 254 is bent from the bonding portion 252 and extends in a substantially vertical direction. Thus, the vertical portion 254 and the second portion 154 face each other when the first member 150 is coupled to the second member 250.

The connecting flange 256 is bent from the circumference of the vertical portion 254. The connecting flange 256 may include a pair of side connecting flanges 1256a and 1256b and an upper connecting flange 2256. The vertical portion 254 has both sides having the side connecting flanges 1256a and 1256b, respectively. The side connecting flanges 1256a and 1256b are bent obliquely from the vertical portion 254 and extend substantially parallel to the outer side surface of the cross member 20 and the outer side surface of the side extension 30, respectively. The vertical portion 254 has an upper side having the upper connecting flange 2256. The upper connecting flange 2256 is bent from the vertical portion 254 and attached to the rear floor 10. As a non-limiting example, the upper connecting flange 2256 may have the same structure as the coupling flange 1154.

Although the first member 150 and the second member 250 have been described as separate and different structures, the first member 150 and the second member 250 may also be integrated with each other.

Figure 6A:
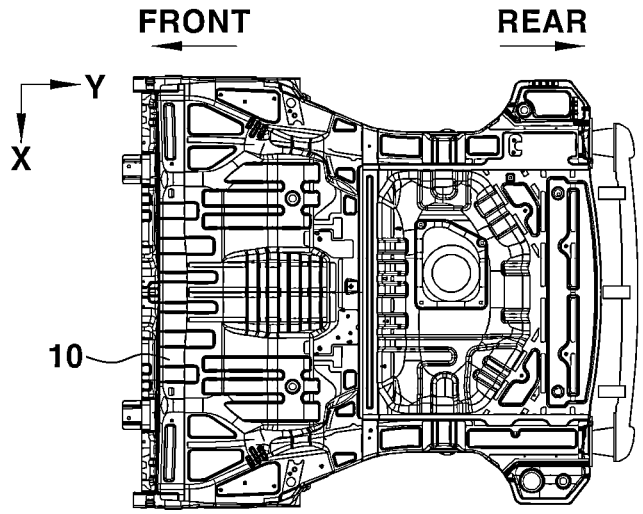
FIG. 6A illustrates a top view of a rear floor of a rear structure of a vehicle according to an embodiment of the present disclosure.
Figure 6B:
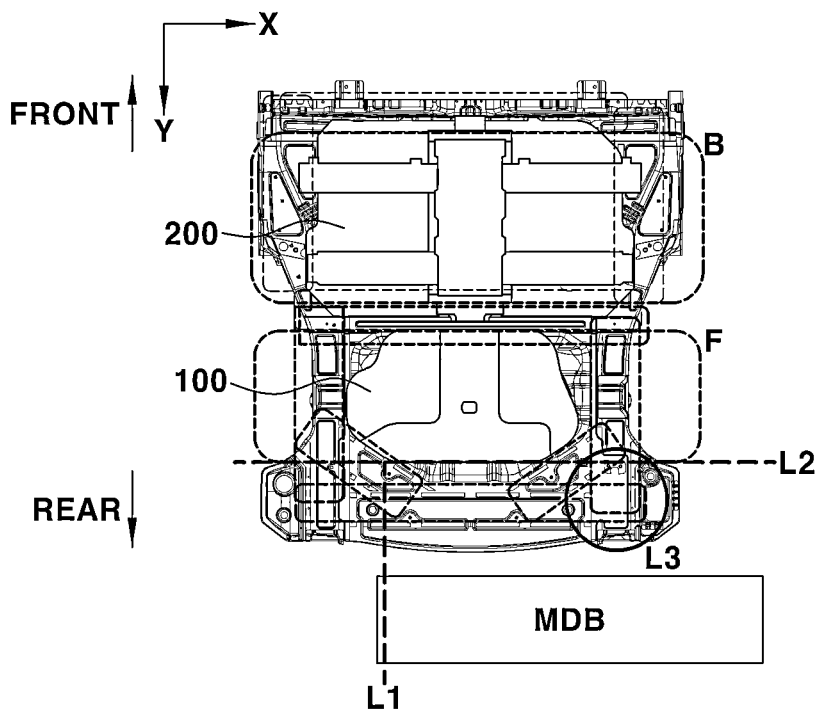
FIG. 6B illustrates a bottom view of a rear floor of a rear structure of a vehicle according to an embodiment of the present disclosure.

FIG. 6A illustrates a top view of the rear floor of the rear structure of the vehicle according to the present disclosure, and FIG. 6B illustrates a bottom view of the rear floor of the rear structure of the vehicle according to the present disclosure.

The vehicle body secures the rear collision performance of the vehicle through the connection of the load path. Although a member to prepare against collision is provided on the left and right sides of the vehicle, when load is concentrated on one side, the member may not perform the function thereof. When load is transmitted in only one direction during the load pass, the load is concentrated in one portion, and the collision energy may not be properly absorbed, thereby increasing local deformation.

According to the present disclosure, a structure, which serves to distribute the force of a bumper back-beam, may be particularly the diagonal member 50 that supports the cross member 20. Because the collision force is effectively distributed to the both sides of the vehicle, breakage of the back beam is prevented and the cross member 20 is not pushed. In addition, according to the present disclosure, the behavior of each member may be kept consistent even after collision.

In FIG. 6B, "B" denotes a protection section of a battery 200, and "F" denotes a protection section of a fuel tank 100. According to the present disclosure, when the vehicle is offset laterally (X-direction) to the left (L1, 70% offset) and a moving deformable barrier (MDB) collides therewith, the fuel tank protection section F and an end line L2 of the diagonal member 50 are aligned. This corresponds to the maximum position where the fuel tank may be protected. In addition, a maximized buckling induction section L3 is provided at the both sides of the vehicle so as to stably absorb the shock.

In other words, the present disclosure is excellent in distributing the collision force in a rear collision, particularly, an offset collision.

Figure 7A:
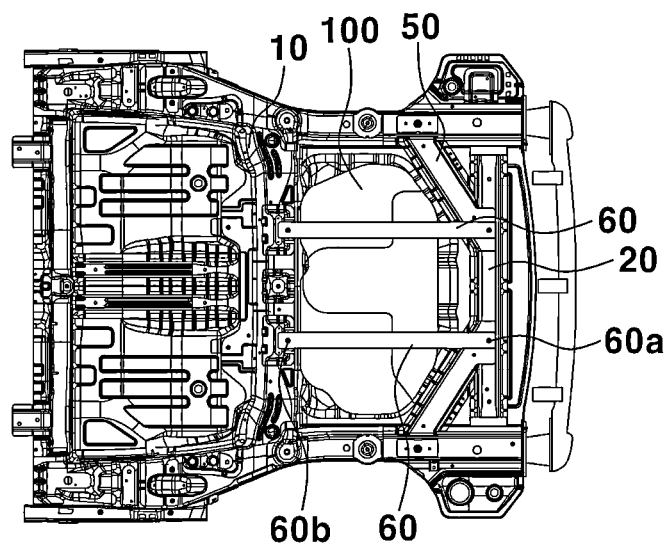
FIG. 7A illustrates a bottom view of a rear floor of a rear structure of a vehicle according to an embodiment of the present disclosure.
Figure 7B:
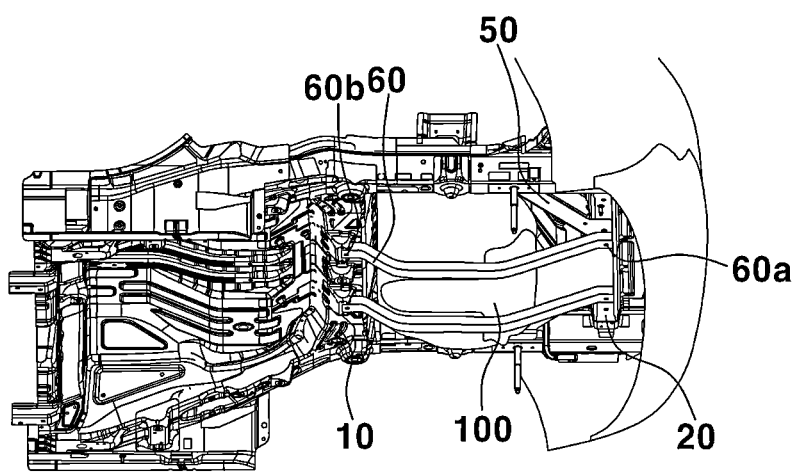
FIG. 7B illustrates a bottom perspective view of a rear floor of a rear structure of a vehicle according to an embodiment of the present disclosure.

As illustrated in FIGS. 7A and 7B, according to an embodiment of the present disclosure, the rear floor 10 may be provided with a reinforcing member 60 at the bottom surface thereof. The reinforcing member 60 may have a proximal end 60a coupled to the cross member 20 or to the diagonal member 50, and the reinforcing member 60 may have a distal end 60b coupled to the bottom surface of the rear floor 10.

Figure 8A:
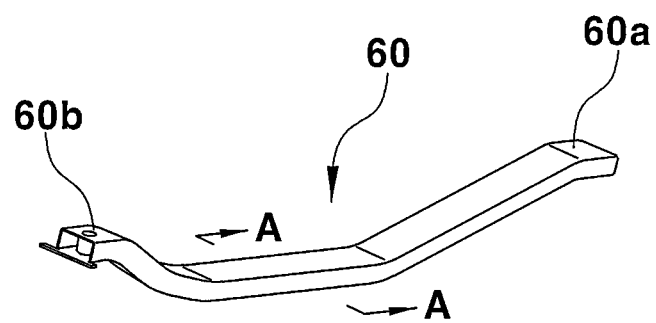
FIG. 8A illustrates a reinforcing member according to an embodiment of the present disclosure.
Figure 8B:
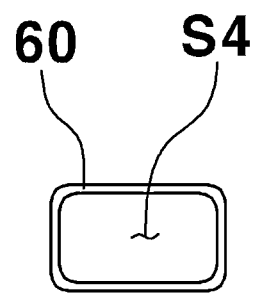
FIG. 8B illustrates a cross-sectional view taken along line A-A of FIG. 8A.

As illustrated in FIGS. 8A and 8B, according to an embodiment of the present disclosure, the reinforcing member 60 defines therein a fourth space S4 that is an empty space.

As described above, because the allowable deformation amount of the fuel tank is very small in the case of a plug-in hybrid electric vehicle (PHEV), additional protection of the fuel tank 100 is needed. For this reason, the present disclosure presents a structure in which at least one reinforcing member 60 supports the fuel tank 100, and in particular, the reinforcing member 60 has the fourth space S4 therein to thereby more effectively prevent deformation of the fuel tank 100 in the event of collision.

As is apparent from the above description, the present disclosure provides the following effects.

According to the present disclosure, there is provided a rear structure of a vehicle capable of effectively dispersing collision energy in a rear collision.

According to the present disclosure, there is provided a rear structure of a vehicle providing excellent protection performance for a battery and a fuel tank in case of a rear collision.

It will be apparent to those of ordinary skill in the art to which the present disclosure pertains that the present disclosure described above is not limited by the above-described embodiments and the accompanying drawings, and various substitutions, modifications and changes are possible within a range that does not depart from the technical idea of the present disclosure.

What is claimed is:

1. A rear structure of a vehicle, the rear structure comprising:
   a rear floor;
   a pair of diagonal members, coupled to a bottom surface of the rear floor, extending obliquely from both sides of the rear floor to a rear side of the rear floor, and symmetrical with respect to a longitudinal centerline of the rear floor;
   a pair of side extensions coupled to the bottom surface of the rear floor at the both sides of the rear floor, respectively, and extending in a longitudinal direction of the rear floor; and
   a cross member disposed between the pair of side extensions at a rear bottom surface of the rear floor,
   wherein the cross member has both ends each spaced apart from a corresponding side extension.

2. The rear structure according to claim 1, wherein the diagonal members extend obliquely from the both sides of the rear floor, respectively, towards the rear side of the rear floor in a direction approaching each other.

3. The rear structure according to claim 1, wherein the diagonal member is closed by the bottom surface of the rear floor so as to define a third space.

4. The rear structure according to claim 1, further comprising at least one reinforcing member having one end coupled to the diagonal member at the rear side of the rear floor, and having another end coupled to the bottom surface of the rear floor at a front side of a fuel tank.

5. The rear structure according to claim 4, wherein the reinforcing member defines therein a fourth space that is an empty space.

6. The rear structure according to claim 1, wherein the diagonal member comprises a first member and a second member coupled to the first member.

7. The rear structure according to claim 1, wherein each of the side extensions is coupled to one side of a corresponding diagonal member, and the cross member is coupled to another side of the corresponding diagonal member.

8. The rear structure according to claim 1, wherein the cross member and the diagonal member are flange-coupled to the rear floor so as to define a first space.

9. The rear structure according to claim 8, further comprising coupling elements provided at both sides of the first space, respectively, wherein the coupling element defines a closed cross-section inside the first space.

* * * * *